July 4, 1939.  S. W. McGEE  2,164,830
AUTOMATIC MULTIPLE LAWN MOWER GRINDING MACHINE
Filed Aug. 25, 1938
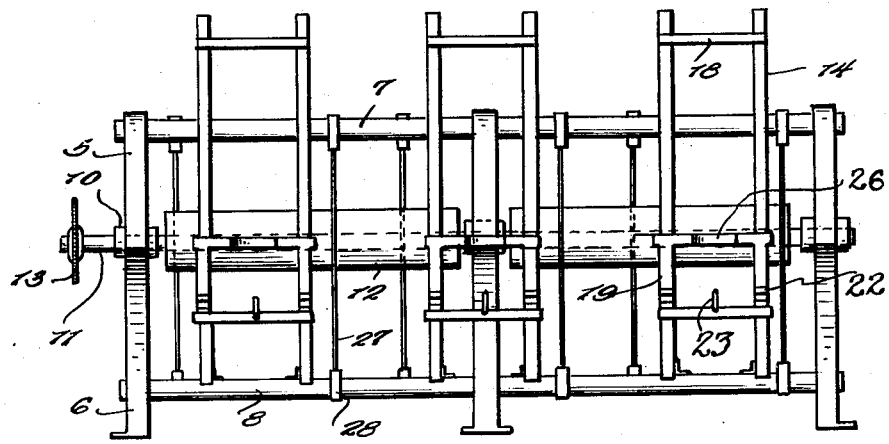
Fig. 1.
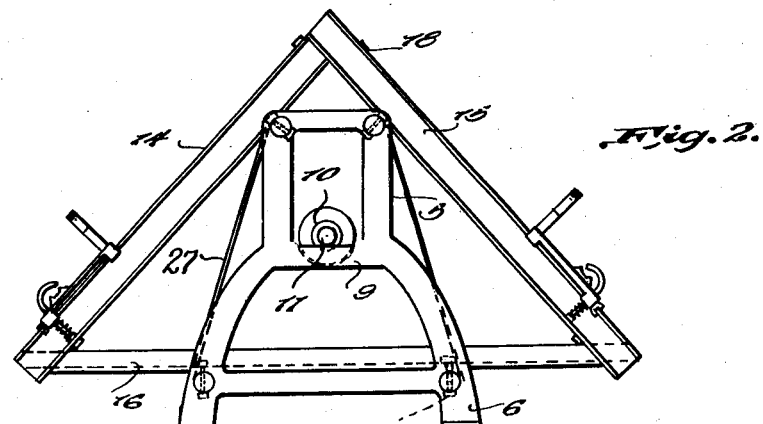
Fig. 2.
Fig. 3.
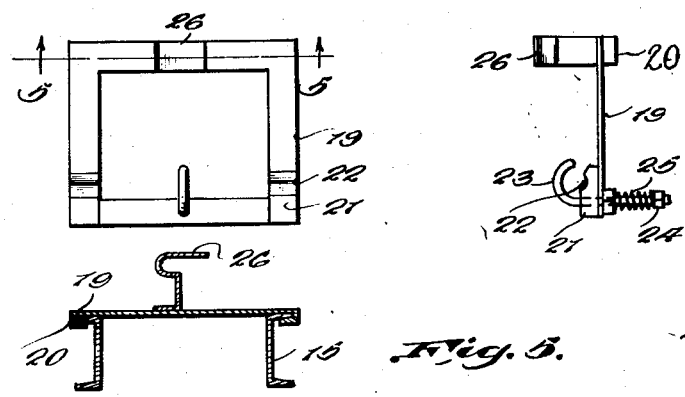
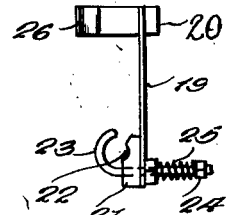
Fig. 4.
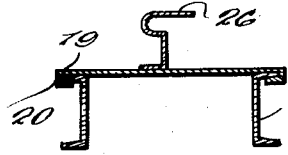
Fig. 5.
Inventor
Samuel W. McGee Patented July 4, 1939

2,164,830

UNITED STATES PATENT OFFICE 2,164,830

AUTOMATIC MULTIPLE LAWN MOWER GRINDING MACHINE

Samuel W. McGee, Franklin, Pa.

Application August 25, 1938, Serial No. 226,718

1 Claim. (Cl. 51—26)

This invention relates to improvements in automatic multiple lawnmower grinding machines and more particularly to a supporting frame for holding a plurality of lawnmowers in driving relation to a power pulley whereby rotary motion is imparted to the cutting reel of the mower, thus permitting the edges of the reel blades and stationary blade to be simultaneously sharpened when a suitable abrasive material is placed between the edges of the blades.

It is an object of the invention to provide a machine which will permit the grinding of a plurality of mowers at the same time.

A further object of the invention resides in providing means for supporting the individual mowers which will permit removal or attachment of each mower without stopping the machine.

Another object of the invention resides in providing a machine of the above-mentioned character which is simple and durable in construction, reliable and efficient in operation and inexpensive to manufacturee.

Other objects and advantages of the invention will be apparent during the course of the following description.

In the accompanying drawing, forming a part of this specification and in which like numerals are employed to designate like parts throughout the same, Fig. 1 is a front elevation of the machine, Fig. 2 is an end view of the same.

Fig. 3 is a plan view of the mower supporting bracket,

Fig. 4 is a side elevation of the same, and,

Fig. 5 is a cross section taken on line 5—5 of Fig. 3.

In the drawing, wherein for the purpose of illustration I have shown a preferred embodiment of my invention, the numeral 5 denotes a plurality of standards having legs 6 for supporting the standards in an upright position. The standards are spaced and equal distance apart and connected at their upper ends by horizontally spaced longitudinal tubular bars 7 arranged in parallel relation. The legs of the standards are connected by longitudinal tubular bars 8 and each of the standards is provided with an intermediate cross bar 9 which supports a bearing 10 in which is journaled the drive shaft 11. A drive pulley 12 is mounted on the drive shaft 11 being formed in sections, each section extending the full length of the space between the standards and a sprocket wheel 13 mounted on one end of the drive shaft serves to connect the drive shaft with a suitable source of power.

A plurality of mower supporting frames 14 of triangular shape are mounted on the bars 7 and 8 at spaced intervals, each frame consisting of a pair of spaced parallel channel irons 15 connected together at one end and adapted to be placed over the bars 7 so as to incline downwardly therefrom. The lower ends of each pair of channel irons are connected by cross bars 16 which rest on the lower bars 8 and to secure the supporting frames against movement the cross bars 16 and channel irons 15 are attached to the bars 8 and 7 by bolts 17. The channel irons 15 of each pair are held in spaced relation by cross bars 18. The inclined channel irons of the supporting frames serve as tracks for the mower holding brackets 19 which are constructed from strap iron welded together to form a square frame. The side members of the brackets have their outer edges turned downwardly and inwardly, as at 20, to engage under the edges of the channel irons 15 slidably connecting the holding brackets to the inclined channel irons. The lower corners of the bracket 19 are provided with blocks 21 having sockets 22 to receive the cross rod of the mower which is held in the sockets by hook 23 mounted in the center of the lower cross piece of the bracket. The shank of the hook 23 is slidably mounted through the lower cross piece and nut 24 on the end of the shank is a coil spring 25 which yieldably holds the hook in engagement with the cross rod of the mower. The upper cross piece of the bracket has a hook 26 attached to the center for engaging over the handle of the mower. Belt guiding wires 27 extend between the upper and lower bars 7 and 8 on each side of the machine and the connected to the bars by collars 28 which are slidable on the bars to permit adjustment of the wires.

In operation, each supporting frame 14 will support two mowers one on each side of the machine and while the machine illustrated is designed for holding six mowers it is obvious that machines may be constructed for holding a larger number of mowers. The mower to be sharpened is placed in the holding bracket 19 which the cross rod secured in the sockets 22 by the hood 23 and the handle engaged with the hook 26. The bracket 19 with the mower thereon is moved up the inclined tracks formed by the channel irons 15 and after the driving wheel of the mower is connected with the drive belt connected to the pulley 12, the bracket is released and moves downwardly until the drive belt is drawn taut. As the drive pulley 12 is constantly in motion, the connection of the drive wheel of the mower with the drive pulley imparts a rotary motion to the cutting reel of the mower and by feeding a suitable abrasive material between the edges of the reel blades and stationary blade, the edges of the blades are simultaneously sharpened. A plurality of mowers may be sharpened at the same time and each mower may be attached or removed from the machine at any time without stopping the machine.

It is to be understood that the form of my invention herein shown and described is to be taken as a preferred example of the same and that certain changes in the shape, size in arrangement of the parts may be made without departing from the spirit of the invention or the scope of the subjoined claim.

Having thus described my invention, I claim:

A lawnmower grinding machine comprising a main frame including standards connected in spaced relation by longitudinal upper and lower bars, a drive pulley extending longitudinally of said frame, mower supporting frames mounted on the bars of said main frame each having inclined tracks on opposite sides of said main frame, mower holding brackets slidably mounted on the tracks of said supporting frames, means detachably connecting the mowers to said brackets, and belt guide wires extending between the upper and lower bars of said main frame and slidably connected thereto.

SAMUEL W. McGEE.